(12) United States Patent
Shu et al.

(10) Patent No.: US 9,183,034 B2
(45) Date of Patent: Nov. 10, 2015

(54) MANAGING AVAILABILITY OF VIRTUAL MACHINES IN CLOUD COMPUTING SERVICES

(71) Applicant: VMware, Inc., Palo Alto, CA (US)

(72) Inventors: Guoqiang Shu, San Jose, CA (US); Keith Farkas, San Carlos, CA (US); Elisha Ziskind, Sharon, MA (US); Joanne Ren, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 295 days.

(21) Appl. No.: 13/896,038

(22) Filed: May 16, 2013

(65) Prior Publication Data

US 2014/0344805 A1 Nov. 20, 2014

(51) Int. Cl.
*G06F 9/455* (2006.01)

(52) U.S. Cl.
CPC .. *G06F 9/45558* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 8,429,362 B1* | 4/2013 | Natanzon et al. | | 711/162 |
| 8,621,461 B1* | 12/2013 | Chandrachari et al. | | 718/1 |
| 8,805,989 B2* | 8/2014 | Hemachandran et al. | | 709/223 |
| 8,850,144 B1* | 9/2014 | Natanzon et al. | | 711/162 |
| 8,959,173 B1* | 2/2015 | Robidoux et al. | | 709/216 |
| 2008/0295096 A1* | 11/2008 | Beaty et al. | | 718/1 |
| 2008/0307259 A1* | 12/2008 | Vasudevan et al. | | 714/23 |
| 2009/0217072 A1* | 8/2009 | Gebhart et al. | | 713/330 |
| 2010/0325471 A1* | 12/2010 | Mishra et al. | | 714/3 |
| 2011/0099267 A1* | 4/2011 | Suri et al. | | 709/224 |
| 2011/0131576 A1* | 6/2011 | Ikegaya et al. | | 718/1 |
| 2011/0239010 A1* | 9/2011 | Jain et al. | | 713/310 |
| 2012/0022910 A1* | 1/2012 | Chi et al. | | 705/7.22 |
| 2012/0096459 A1* | 4/2012 | Miyazaki | | 718/1 |
| 2012/0110186 A1* | 5/2012 | Kapur et al. | | 709/226 |
| 2013/0007506 A1* | 1/2013 | Jain et al. | | 714/4.12 |
| 2013/0042115 A1* | 2/2013 | Sweet et al. | | 713/176 |
| 2013/0061220 A1* | 3/2013 | Gnanasambandam et al. | | 718/1 |
| 2013/0091282 A1* | 4/2013 | Tontiruttananon et al. | | 709/226 |
| 2013/0159637 A1* | 6/2013 | Forgette et al. | | 711/154 |
| 2013/0227335 A1* | 8/2013 | Dake et al. | | 714/4.2 |
| 2013/0305083 A1* | 11/2013 | Machida | | 714/4.1 |
| 2013/0346573 A1* | 12/2013 | Hemachandran et al. | | 709/223 |
| 2014/0032405 A1* | 1/2014 | Kurabayashi et al. | | 705/40 |
| 2014/0067763 A1* | 3/2014 | Jorapurkar et al. | | 707/639 |
| 2014/0082202 A1* | 3/2014 | Zhao | | 709/226 |
| 2014/0130055 A1* | 5/2014 | Guha | | 718/104 |
| 2014/0157264 A1* | 6/2014 | Russinovich et al. | | 718/1 |
| 2014/0297941 A1* | 10/2014 | Rajani et al. | | 711/114 |
| 2014/0304553 A1* | 10/2014 | Gondi et al. | | 714/39 |
| 2014/0380079 A1* | 12/2014 | Katano et al. | | 713/330 |

* cited by examiner

*Primary Examiner* — Emerson Puente
*Assistant Examiner* — Mehran Kamran

(57) ABSTRACT

Recovery of virtual machines when one or more hosts fail includes identifying virtual machines running on the remaining functioning hosts. Some of the identified powered on virtual machines are suspended in favor of restarting some of the failed virtual machines from the failed host(s). A subsequent round of identifying virtual machines for suspension and virtual machines for restarting is performed. Virtual machines for suspension and restarting may be identified based on their associated "recovery time objective" (RTO) values or their "maximum number of RTO violations" value.

17 Claims, 14 Drawing Sheets

Fig. 3A

Add Service Offering — 300

Name: Gold

Description: This service offering offers an RTO of 10 minutes and limits the RTO violations to less than 2 in 30 days.

RTO: 10 Minutes

Number of Permitted Service violations: 2 in: 1 month

OK    Cancel

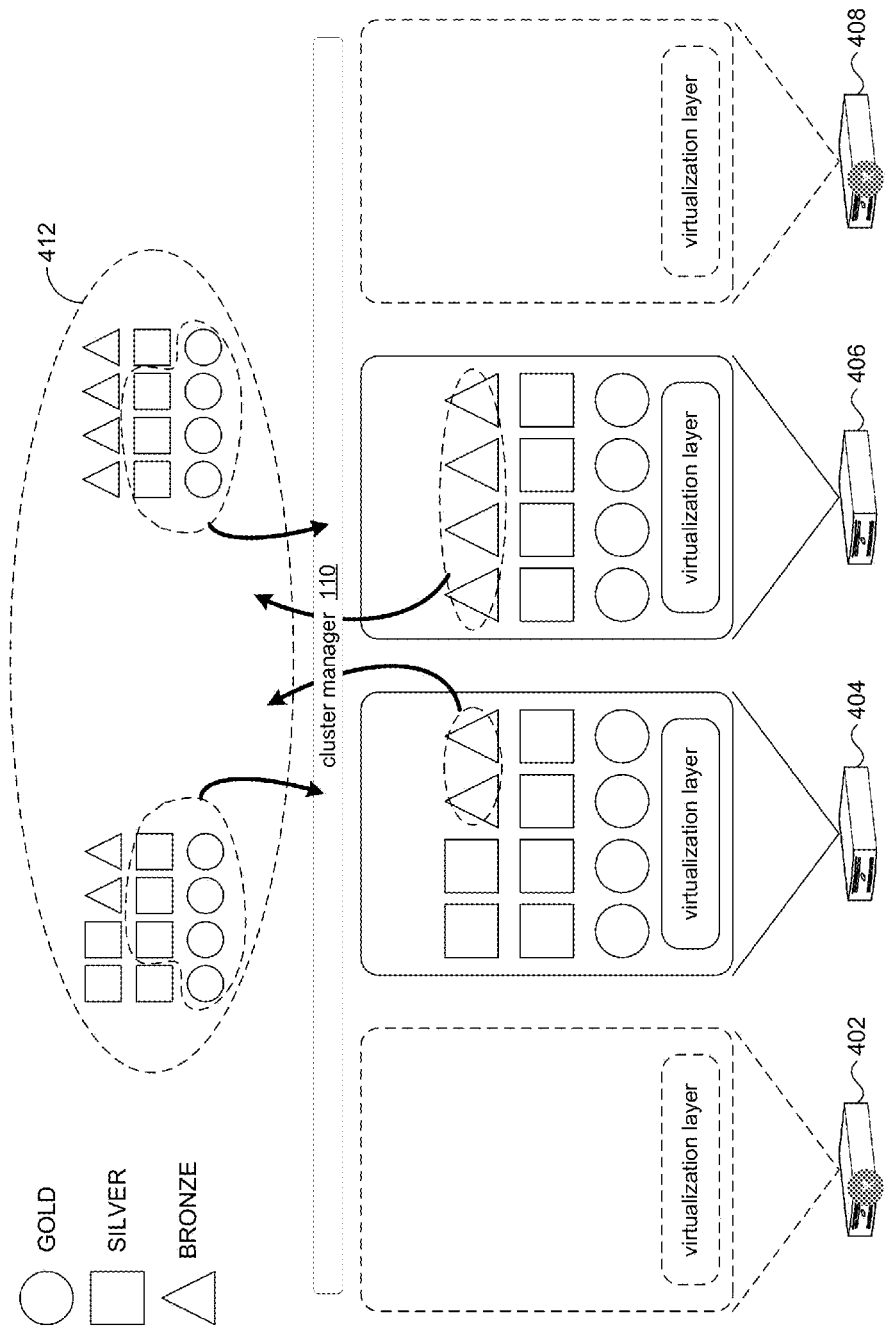

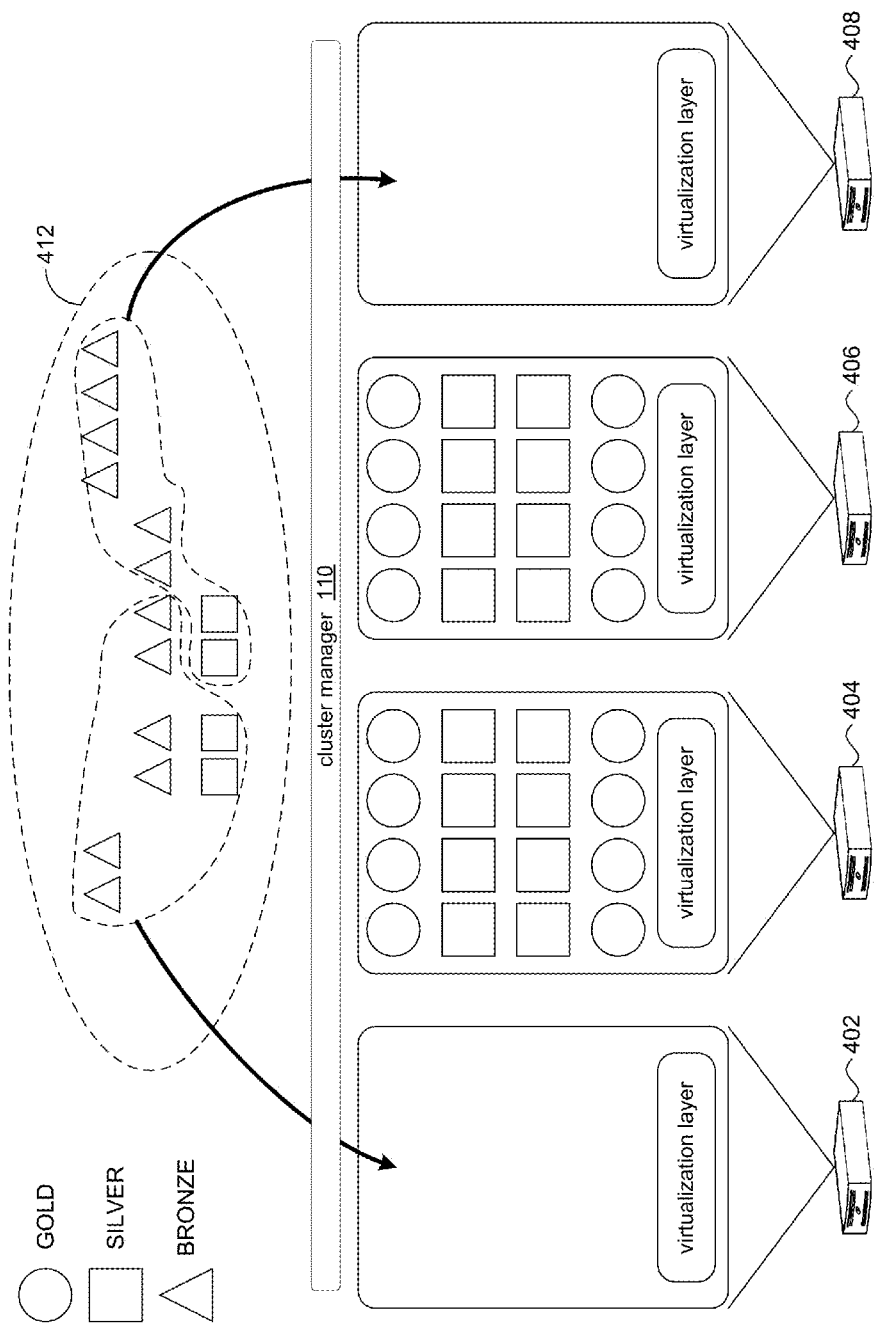

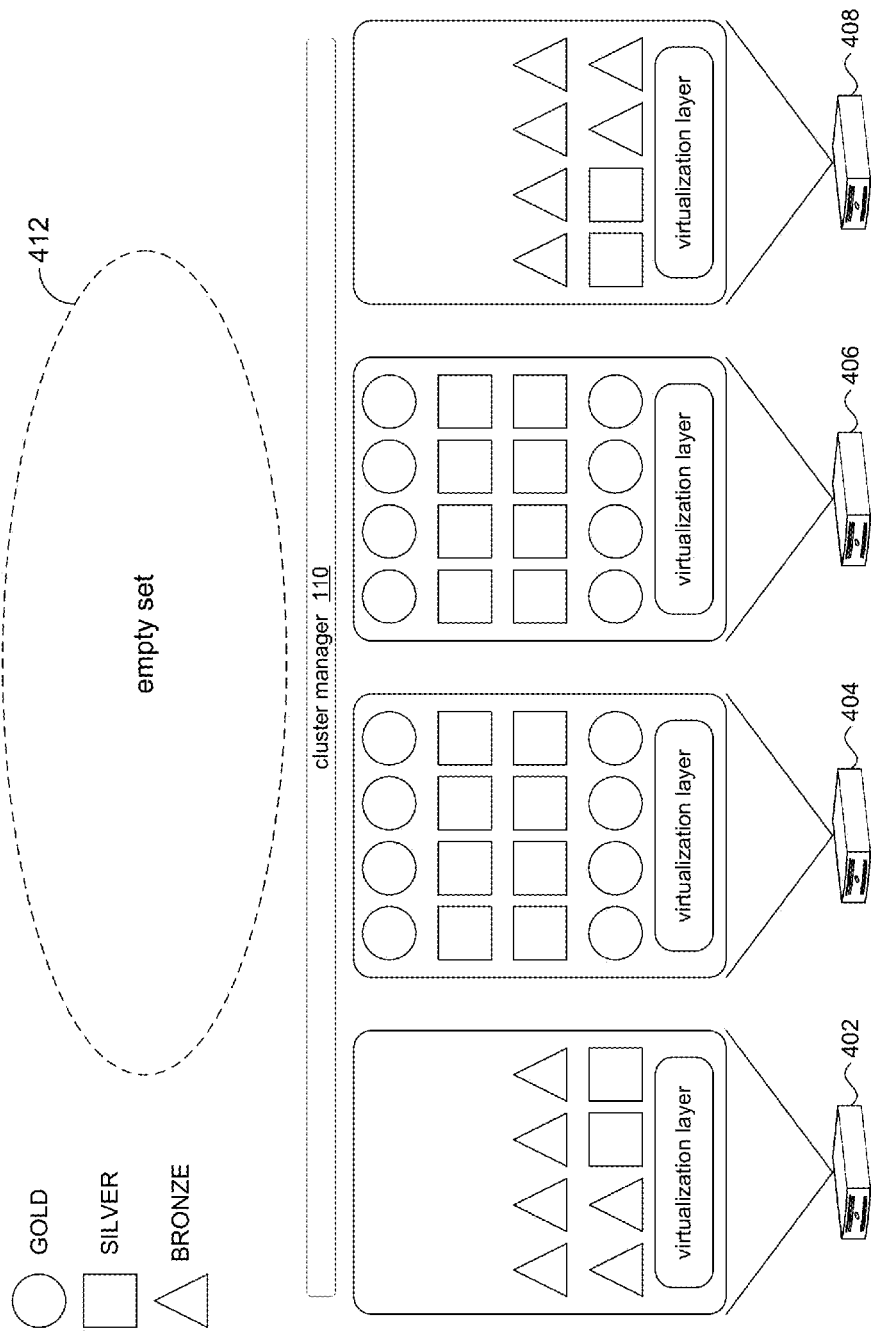

MANAGING AVAILABILITY OF VIRTUAL MACHINES IN CLOUD COMPUTING SERVICES

BACKGROUND

Cloud computing refers to the delivery of computing and/or storage services over the Internet or other suitable communication network. Cloud computing services may be hosted within an enterprise and provided to support operations of departments within the enterprise, to groups of people or individuals within the enterprise, and so on. Cloud computing services may be commercially provided by cloud computing service providers to customers (or consumers), whether they be organizations or individuals. A cloud computing service may be provided (or sold) to customers on-demand. A cloud computing service may be provided in increments of time, e.g., by the hour, monthly, etc. Service offerings typically include computing capacity, network capability, and storage capacity.

Three categories of services are generally recognized: infrastructure-as-a-service (IaaS), platform-as-a-service (PaaS) and software-as-a-service (SaaS). IaaS type cloud computing services provide the customer with a virtual infrastructure of servers and storage. The customer can request (and, in the case of a commercially provided service, pay for) only as much capacity as they need. PaaS type cloud computing services are typically defined as a configuration of software (applications, development tools, etc.) hosted on the provider's cloud computing infrastructure. The PaaS platform provides customers with the underlying computing and storage infrastructure to support their applications. In the SaaS cloud computing model, the provider supplies the hardware infrastructure and the software product(s), which the customer accesses through a front-end portal. Services can be anything from Web-based email to inventory control and database processing.

Cloud computing provides an organization with the ability to host applications on computing infrastructure provided by others. This model has many benefits but these cannot be realized if the availability of the computing resources backing the organization's virtual data center (VDC) does not match the organization's needs. The "availability" of providers of computing and storage infrastructure is sometimes expressed in terms of "host failures"; e.g., "Our service offering protects against two host failures." To an organization, host failures are not a useful metric for assessing the level of availability that is being provided. First, expressing availability in terms of host failures competes against the idea of hiding the underlying infrastructure, which is a key component of the cloud computing model. Second, organizations care about application uptimes, and they cannot readily infer how long an application will be down from knowledge about how many host failures are anticipated.

SUMMARY

Management of virtual machines (e.g., in one or more cloud computing services) includes detecting one or more failed hosts. Based on their recovery time objective (RTO) values, some of the virtual machines running on the remaining functioning hosts are suspended and some of the failed virtual machines are restarted. A periodic check is made to determine host recovery or that RTO values of suspended virtual machines are about to be violated. Accordingly, some suspended virtual machines are identified for restarting and some running virtual machines are identified for suspension.

In some embodiments, a maximum number of RTO violations (MRV) value may be used in addition to the RTO metric to identify virtual machines for suspension.

In some embodiments, when the failed host recovers, then the suspended virtual machines may be restarted on the recovered host.

Is some embodiments, the virtual machine constitute one or more cloud computing services.

The following detailed description and accompanying drawings provide a more detailed understanding of the nature and advantages of the present invention.

BRIEF DESCRIPTION OF THE DRAWINGS

FIG. 3A illustrates an example of a service level definition interface.

FIG. 4C illustrates an initial recovery step in the example of a failure and recovery scenario.

FIGS. 4F and 4G illustrate recovery of the failed hosts in the example of a failure and recovery scenario.

FIG. 4H illustrates a deployment subsequent to host recovery in the example of a failure and recovery scenario.

DETAILED DESCRIPTION

Disclosed embodiments relate to providing and managing cloud computing services based on a recovery time objective (RTO) metric. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
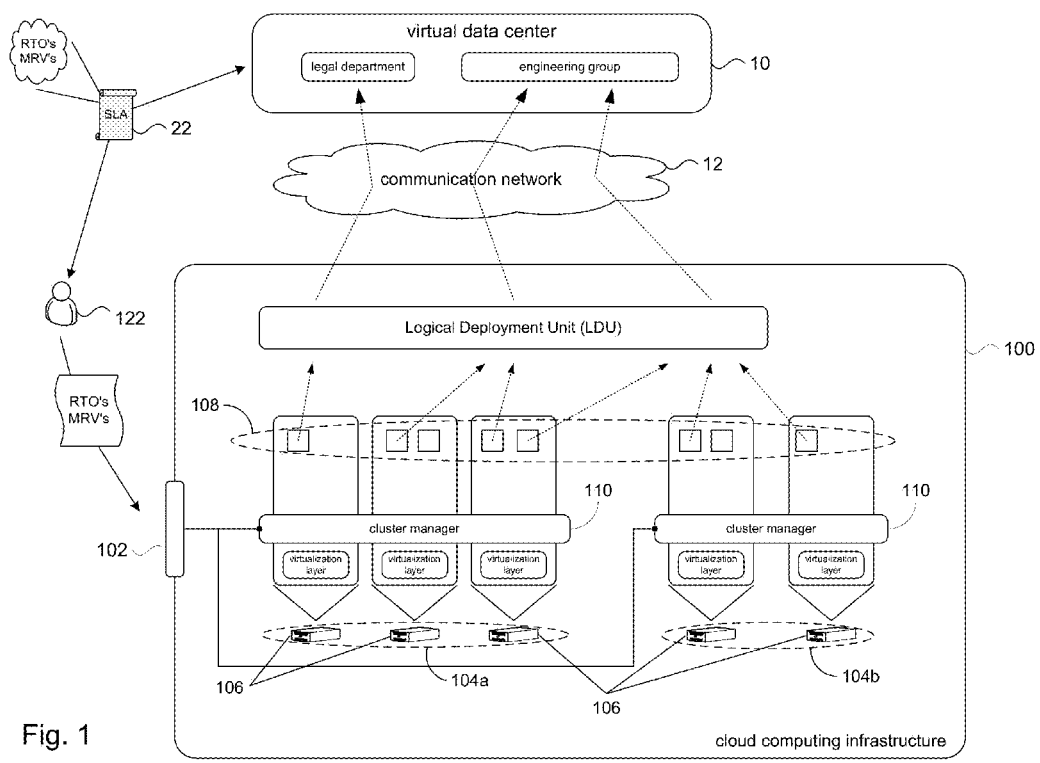
FIG. 1 is a system overview of cloud computing service provisioning in accordance with the present disclosure.

FIG. 1 shows an illustrative embodiment for providing and managing cloud computing services in accordance with principles of the present disclosure. A virtual data center 10 may comprise a deployment of cloud computing services provided by a cloud computing infrastructure 100 and accessed via a communication network 12. The data center 10 is "virtual" in that the cloud computing infrastructure 100 may provide computing and storage services using virtualization technology.

The virtual data center 10 may be any suitable configuration of cloud computing services, including computing services, communication services, storage services, or a combination of these services. The illustrative embodiment in FIG. 1, for example, shows the virtual data center 10 as a data center in an enterprises, and includes a deployment of cloud computing services to support a legal department and another deployment of cloud computing services for an engineering group. As another example, the virtual data center may be a configuration of cloud computing services comprising one virtual machine (VM) and some storage capacity. In general, cloud computing services may be scaled to the needs of an enterprise down to the needs of a single user.

The cloud computing infrastructure 100 may comprise one or more clusters 104a, 104b of virtualization hosts ("hosts") 106. In the illustrative embodiment shown in FIG. 1, the cluster 104a comprises three hosts 106 and cluster 104b comprises two hosts 106. Depending on context, the term "cluster" may refer to the VMs 108 instantiated one host 106, in a single cluster of hosts, among several clusters of hosts, and so on.

Each host 106 comprises a physical infrastructure for virtualization, and may include one or more central processing units (CPUs), network devices, and storage devices. The host 106 includes a virtualization layer that interacts with the physical infrastructure of the host to support multiple instances of VMs 108. An example of a virtualization layer is the ESX® hypervisor software by VMware, Inc.

Each cluster 104a, 104b may include a cluster manager 110 to manage the hosts comprising the respective cluster. The cluster manager 110 may comprise a CPU and associated computer memory and physical data storage. Computer executable program code stored on a non-volatile computer readable storage medium (e.g., physical data storage) may be configured to operate the cluster manager 110 to perform processing in accordance with the present disclosure. A user interface 102 may be used to access each cluster manager 110 in order to configure and otherwise manage each cluster 104a, 104b. The user interface 102 may also provide access to other systems within the cloud computing infrastructure 100. An example of a cluster manager 110 is the vCenter™ management application by VMware, Inc.

Cloud computing services may be packaged and provided to customers as logical deployment units (LDUs). An LDU may comprise one or more VMs 108 from among the clusters 104a, 104b. The LDU may be deployed in a virtual data center as needed to provide cloud computing services in the enterprise.

The virtual data center 10 may be established by a service level agreement (SLA) 22 (or multiple SLAs) negotiated between the enterprise ("customer") and a provider 122 of the cloud computing services. In accordance with principles of the present disclosure, the SLA 22 may specify the availability of cloud computing services in terms of recovery time objectives (RTOs) and maximum numbers of RTO violations (MRVs), in addition to or instead of traditional metrics such as "uptime", host failure rates, power failure rates, and so on. In some embodiments, the RTO value may refer to a duration of time (e.g., minutes, hours, days) within which a VM (or a service provided by the VM such as computing service, storage service, etc.) is expected to be restarted or otherwise restored after a disruption of the service. If the VM is not restarted within the RTO time value, this is considered an "RTO violation." The MRV value refers to the maximum number of RTO violations that are permitted within a given period of time; e.g., three RTO violations per month. In accordance with principles of the present disclosure, the provider 122 may use RTO values and MRV values contained in the terms in the SLA 22 to define a suitable configuration of cloud computing services for the customer. These aspects of the present disclosure will be discussed in more detail below.

In some embodiments, "restarting" a VM may include not only powering on (e.g., booting up) the VM, but booting up the guest operating system (OS) on the VM as well. In some embodiments, a VM may be deemed restarted after the VM is powered on, the guest OS is booted, and one or more applications have started up. In other embodiments, restart of a VM may be defined differently. The specific meaning of when a VM is deemed to have "restarted" is a matter relating to the business policies of the cloud computing service provider.

Workflows for the provisioning of cloud computing resources in accordance with the present disclosure will now be discussed in connection with FIG. 2. There is a configuration workflow and a failover strategy workflow. The failover strategy describes processing to maintain cloud computing services in the face of host failure(s). The configuration workflow describes processing to configure an initial placement of VMs to provide cloud computing resources to the customer, which will now be discussed.

In a step 202, the provider of cloud computing services may define different levels of services to offer to potential clients. In some embodiments, for example, the provider may define "tiers" of service that will be offered. Each tier may specify an RTO value. The RTO value for a given tier of service applies to all VMs running at that service level. More specifically, the RTO value associated with a VM specifies the amount of time (e.g., minutes) within which a VM must "restart" on a host after the VM has failed (e.g., due to a failure in the host). In accordance with the principles of the present disclosure, the RTO value applies to the VM and not to the host on which the VM is running.

If the amount of time to restart exceeds the RTO value, then a RTO violation has occurred. A service level may permit some number of RTO violations, called the "maximum number of RTO violations" (MRV) value. Accordingly, in some embodiments, a tier may specify an MRV value in addition to the RTO value. The MRV value for a given service level tier applies to all VMs running at that service level. In particular, the MRV value associated with a VM specifies the maximum number of RTO violations that the VM is permitted to have for a given period of time.

In an illustrative embodiment, a provider may define, for example, three tiers of service: A tier-1 (Platinum) service level may have an RTO value of 2 minutes and an MRV value of 1 per month. Qualitatively speaking, VMs operating in a Platinum tier service must restart quickly (i.e., within 2 minutes) after each failure. As an observational note, if a Platinum-tiered VM restarted once in a one month period without violating its associated RTO value, that VM will have had an uptime percentage equal to or better than $100 \times (1-2/M)$, where M is the number of minutes in a month. A lower tier (Silver) service level may have an RTO value of 60 minutes and an MRV value of 5 per month. This can be taken to mean that there is no great urgency to restart silver-tiered VMs. It is noted that the uptime is not used as a guarantee of a performance level, but rather may be used as a measure to assess performance.

In some embodiments, the user interface 102 of the cloud computing infrastructure 100 may be used to define the several tiers of service level offerings. Referring for a moment to FIG. 3A, for example, dialogue box 300 may be presented in the user interface 102. The provider may "name" the service level and provide a description of the service level. The RTO may be specified, for example, by entering a numeric value in an input box. A drop down menu may be provided to select a suitable unit of time (e.g., minutes, hours, etc.). The MRV value may be specified in a similar way. In some embodiments, the MRV may be limited to specific values, and so a drop down menu of values may be provided instead of an input box (such as illustrated in FIG. 3A).

Figure 2:
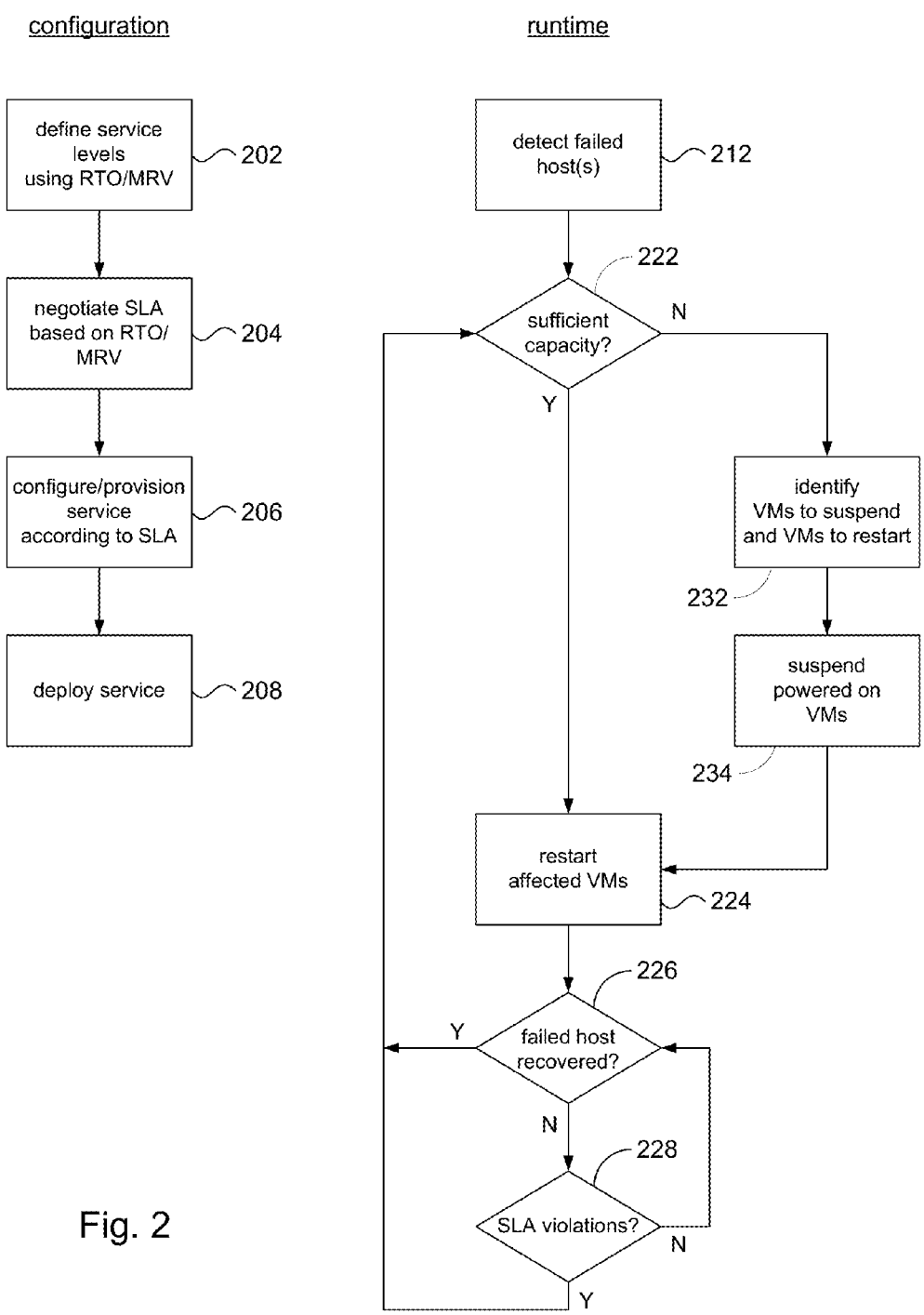
FIG. 2 shows workflows according to principles of the present disclosure.

Continuing with the workflow in FIG. 2, after the provider has defined the service level offerings in step 202, the provider may offer its cloud computing services to customers. Accordingly, in a step 204 an SLA may be negotiated between the provider and a customer. The SLA sets forth terms of the cloud computing service such as computing capacity, storage capacity, duration of the service, and the like. In addition, the SLA may include terms relating to system availability. For example, the provider may offer different service levels to the user such as Gold service, Silver service, Bronze service, etc. In accordance with the present disclosure, each service level may be associated with an RTO value and an MRV value that describes the recovery time behavior of the VMs comprising the cloud computing service. If the provider is a commercial operation, then the SLA may be a legal agreement between the provider and the customer. The RTO values and MRV values in the SLA may represent guarantees as to how long it takes to respond to a given outage and how many times the guarantees can be violated before some remediation is required on the provider's part; e.g., giving a free month of service for violation of the terms of the SLA. If the provider is an information technology (IT) group within an organization, the SLA may still set forth the needs of the "customer", but otherwise may not have any legal effect.

Figure 3B:
FIG. 3B illustrates an example of a service provisioning interface.

In a step 206, the provider may configure their cloud computing infrastructure 100 to define the cloud computing service for the customer according to terms of the SLA. This may include selecting the proper RTO and MRV values as specified in the SLA. In some embodiments, the RTO and MRV values may be explicitly specified in the SLA. In other embodiments, a service level (e.g., Gold, Silver, etc.) may be called out, and the RTO and MRV values may be determined from the specified service level. Referring for a moment to FIG. 3B, for example, an illustrative example of a dialogue box 302 may be presented in user interface 102 to define the cloud computing service. Among the action items in the dialogue box 302 is an "add VM(s)" action item, allowing the provider to configure the VMs that will constitute the cloud computing service. Another action, "select default VM services" may trigger the dialogue box 302 to present a drop down menu allowing the user to select a pre-defined service level (e.g., see FIG. 3A). A description area can describe the selected service level in terms of RTO and MRV.

Having performed the initial placement of VMs to configure the cloud computing service, the provider may then deploy the VMs comprising the newly configured cloud computing service (step 208). In some embodiments, this may include storing the configuration of VMs and other resources of the cloud computing service in a database or other suitable data store. The RTO and MRV values corresponding to the selected service level may be stored or otherwise associated with the configuration data. When the customer subsequently accesses the cloud computing service, the constituent VMs may be powered on, caused to boot up their respective guest OS's, start their respective applications, and so on to a point where they can begin providing the intended services to the customer. The SLA has an impact on how the VM will be provisioned (placed), and the following paragraphs will elaborate this part. The discussion will now turn to the failover strategy workflow in accordance with the present disclosure.

In some embodiments, the failover strategy workflow may execute in the cluster. For example, referring to FIG. 1, the cluster manager 110 in each host 104a, 104b may execute the failover strategy. Thus, in a step 212, for example, the cluster manager 110 detects a failure in one (or more) hosts 106. For the purposes of the present disclosure, a "failed host" is a host that is determined to be not functional and no VMs can be run on it. VMs that were running on the failed host ("failed VMs") will no longer be running; the failed VMs are deemed to be "powered off."

In step 222, the cluster manager 110 may determine whether there is sufficient failover capacity in the cluster that contains the failed host to restart the failed VMs. The "failover capacity" of a cluster refers to the ability of the cluster to restart VMs affected by failure of a host in the cluster without affecting VMs already running in the remaining functioning hosts. A certain amount of capacity (failover capacity) may be set aside in each host in a cluster in order to restart VMs that fail.

In some embodiments, for example, a number may be computed that represents how many VMs can be failed over to a single host of each tier while satisfying their associated RTO values. This number may influence the placement of VMs of each service level tier in the cluster. Suppose, for example, only 20 VMs can be restarted on a host without violating a one minute RTO value for given tier. If the cluster contains 10 hosts and the provider wishes to tolerate 2 host failures, then no host may contain more than 160 VMs (8 hosts times 20 VMs per host) of the given tier. If a host contained more than 160 such VMs, then the $161^{st}$ VM and up could not be restarted within the RTO value. To compute the maximum number of VMs of each tier that can reside on a single host, the following algorithm can be used once the RTO values have been defined for each service level. The assumption here is that the $RTO_i$ value of the i-th tier is smaller than that for the (i+1)-th tier:

---
Compute $N_i$

Let $N_i$ be the number of VMs of tier i that can be restarted on a single host within the RTO for the i-th tier
Let N be the total number of VMs counted so far
Assume we have K tiers, tier 0, 1, 2..K−1 (lowest)
For i = 0 to K
   $N_i$ = the number of VMs that can be failed over to one host within $RTO_i$ time units - N
   N = N + $N_i$
---

Next, we can compute the number of VMs on each tier that could reside on the same host. Note that other factors may limit the number of VMs that can be placed on a host including resource (memory, bandwidth, etc.) reservations, limits imposed by licensing, the supported limit, and so on. For a VM in the i-th tier, the limit per host may be computed as:

(#Hosts−#ConcurrentFailure)×$N_i$, where #ConcurrentFailure is the number of anticipated concurrent host failures.

Returning to step 222 of FIG. 2, if the failover capacity of the cluster is sufficient to accommodate the failed VMs, then in a step 224 the cluster manger 110 my restart all of the failed VMs. In some embodiments, the failed VMs may be restarted in sequential order according to their associated RTO values. For example, failed VMs having the lowest RTO value (and presumably belonging to the highest service level) would be restarted before VMs having a higher RTO value, in order to avoid VMs violating their RTO values.

If, in step 222, the cluster manager 110 determines that the cluster does not have sufficient failover capacity, then in accordance with principles of the present disclosure, cluster manager may have to suspend some already running VMs in order that some failed VMs can be restarted. Accordingly, in a step 232 the cluster manager 110 may identify VMs running in the remaining functioning hosts as candidates for suspension. The identification of candidate VMs for suspension may be based at least on their associated RTO values, MRV values, or a combination of both.

In some embodiments, the candidate VMs may be compiled from the VMs comprising the cloud computing services that are provided to the customer. For example, the cluster manager 110 may maintain a sorted list of running VMs in increasing order of priority (i.e., increasing RTO values) that have lower priority than the failed VMs. Among the VMs in the sorted list, the lower tiered VMs or the VMs that have been down (failed) the least number of times may be deemed to be of lower priority in the list, and thus may be the first ones to be selected from the list for suspension. The rationale is that a lower tiered VM is likely to have a higher RTO value. For example, if the RTO value for VMs of a lower tiered service level is 14 days, then suspending one or more such VMs would provide a time period of 14 days during which some higher tiered failed VMs may be restarted, and thus avoid violating SLAs for those higher tiered VMs. Similarly, a VM that has been down the least number of times is likely not to have reached its associated MRV value (i.e., has not exceeded the maximum number allowed RTO violations). Therefore, suspending such a VM and then restarting it at a later time that exceeds its RTO value would not violate its SLA, and would allow for a higher tiered failed VM to be restarted.

In other embodiments, the candidate VMs may be compiled from among multiple customers of cloud computing services. A sorted list of VMs may be compiled for each customer in the manner discussed above. The candidate VMs may come from each of the sorted lists; for example, by selecting the lowest priority VMs from each sorted list in round robin fashion.

Continuing with step 232, the cluster manager 110 may use a placement algorithm (discussed below) to identify VMs from the set of candidate VMs identified for suspension, and identify VMs from among the failed VMs to restart. In some embodiments, the placement algorithm may use the RTO values associated with the VMs to decide which of the candidate VMs to suspend and which of the failed VMs to restart.

In some embodiments, step 232 may consider VMs across multiple clusters. For example, the set of candidate VMs for suspension may be determined from cluster(s) in addition to the cluster having the failed host. The placement algorithm may suspend running VMs from among multiple clusters and may restart VMs across more than one cluster.

In step 234, candidate VMs identified in step 232 may be suspended, thus freeing up capacity in the cluster(s) and in particular capacity in the specific host in the cluster(s) on which the suspended VMs were running. In a step 224, VMs identified in step 232 may be restarted in those specific hosts.

Periodic monitoring may be performed: (1) to determine when a failed host has recovered; and (2) to identify when suspended VMs that are waiting to be restarted are in jeopardy of their SLAs being violated with respect to their RTO or MRV values. VMs may be suspended because, as explained in the NO branch of step 222, there was insufficient capacity to restart the VMs affected by the failure of a host. Consequently, some running VMs become suspended in favor of some of the failed VMs, while other remaining failed VMs remain suspended because they could not be restarted.

Accordingly, a monitoring loop may be performed to monitor or recovery of a failed host and imminent violation of an SLA. Accordingly, in a step 226 if a failed host has not recovered, then in a step 228 a determination is made whether any of the suspended VMs are in jeopardy of their SLAs being violated. If step 228 evaluates to NO, then the monitoring loop repeats with step 226. If step 228 evaluates to YES, then processing continues at step 222 to determine if there is sufficient capacity to restart all of the suspended VMs. If NO, then processing continues with steps 232 and 234, and 224 to recomputed which of the running VMs to suspend and which of the suspended VMs to restart. At this point, the suspended VMs include failed VMs that had not been restarted and running VMs that were suspended. By periodically reevaluating the suspended VMs, it is possible to reduce the likelihood of violating an SLA by rotating out running VMs and rotating in suspended VMs, until the failure recovers (e.g., failed host comes back on line). In some embodiments, for example, VMs of the same tier can "share" some of the downtime so that all VMs survive in terms of their SLAs until the failure is recovered.

When the failed host has recovered, then step 226 will evaluate to YES. Processing loops back to the failover strategy beginning at step 222 to determine whether and how to restart the VMs in the recovered host.

Although not shown in FIG. 2, in accordance with some embodiments, a load balancing process may continuously execute as a background process. Load balancing may enforce a similar placement pattern as in the initial placement stage (steps 202-208). In some embodiments, for example, load balancing may shuffle the VMs so that on each host there are at most a predetermined number of VMs in each tier. Other or additional load balancing criteria may be implemented in other embodiments.

Figure 4A:
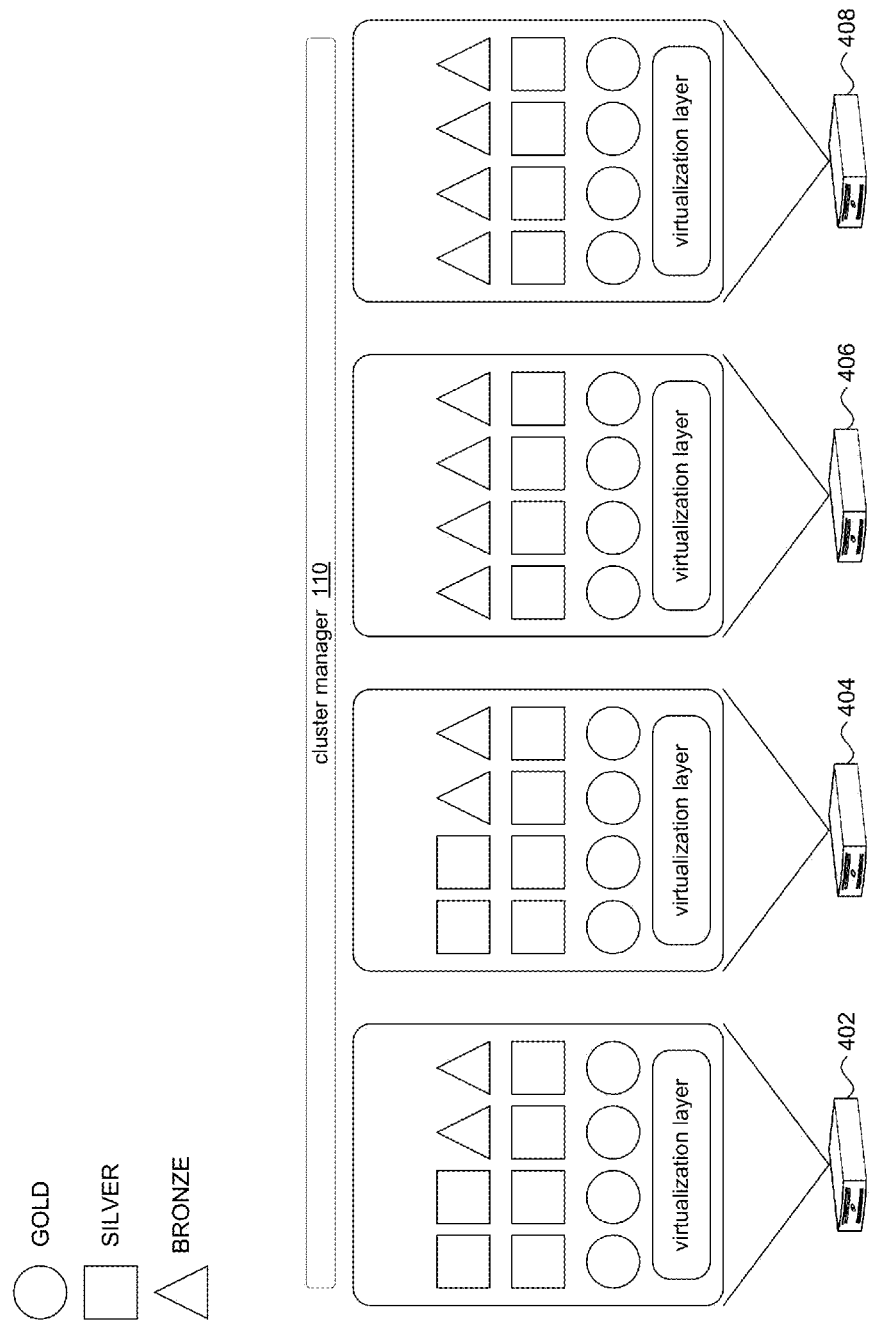
FIG. 4A illustrates initial deployment in an example of a failure and recovery scenario.

As an example, FIGS. 4A-4I illustrate a host failure and recovery sequence to explain the failover strategy shown in FIG. 2. FIGS. 4A-4I show processing within a cluster of hosts. However, a similar example can be imagined that involves multiple clusters. The example shows VMs deployed for some number of cloud computing services at three service levels: Gold, Silver, and Bronze. FIG. 4A shows an initial deployment of VMs in a cluster of four hosts 402, 404, 406, 408. The VMs are identified by the color of their respective service levels, namely Gold, Silver, Bronze.

Figure 4B:
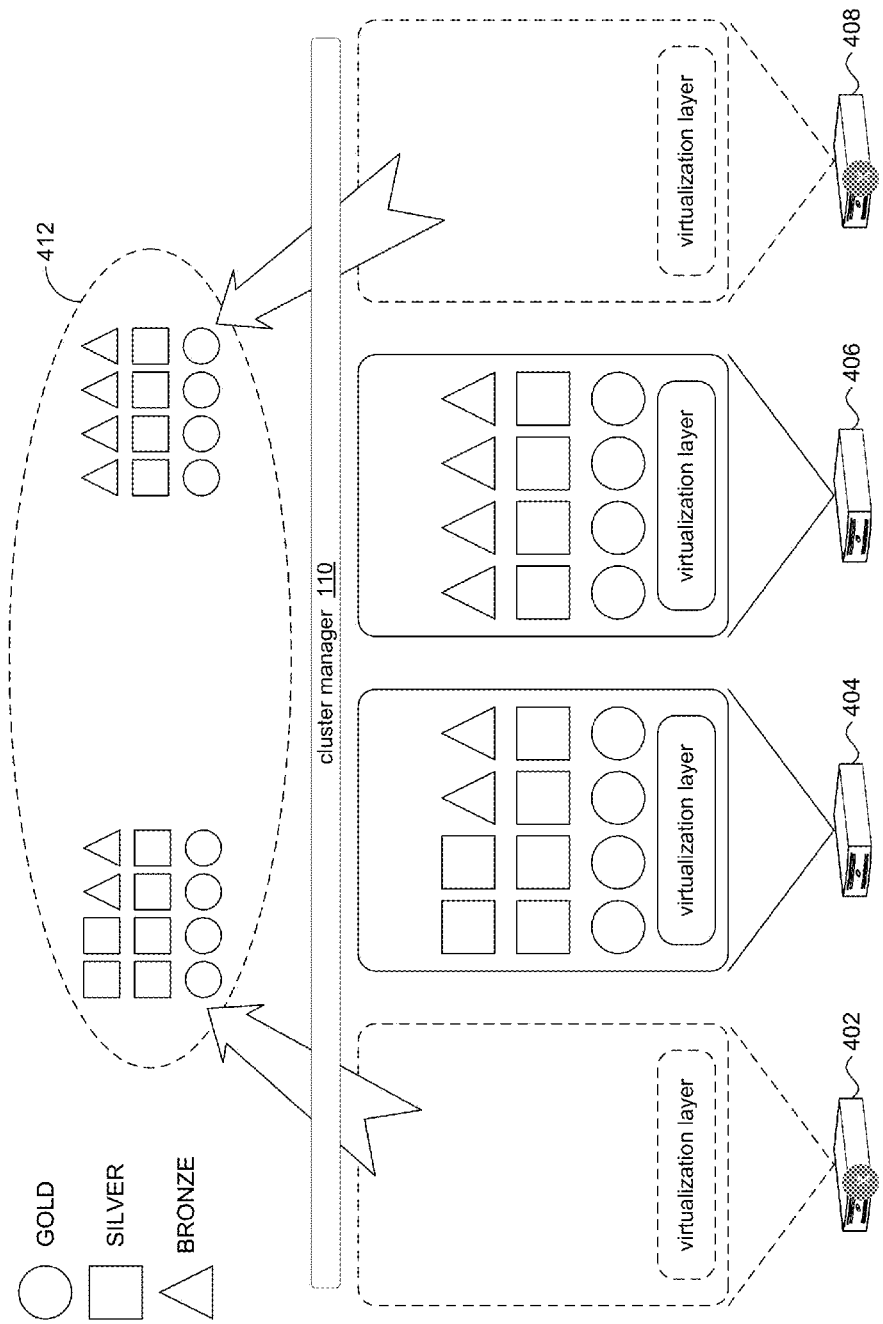
FIG. 4B illustrates failed hosts in the example of a failure and recovery scenario.

FIG. 4B shows that hosts 402 and 408 have failed (e.g., power failure), which the cluster manager 110 may detect in step 212. A set 412 of suspended VMs comprises the failed VMs that were affected by the failure of hosts 402, 408. Among the failed VMs are eight Gold level VMs, ten Silver level VMs, and six Bronze level VMs. It can be assumed that the Gold level VMs are associated with a lower RTO value than the Silver level VMs and the Bronze level VMs. Likewise, the Silver level VMs are associated with an RTO value lower than the Bronze level VMs.

Figure 4D:
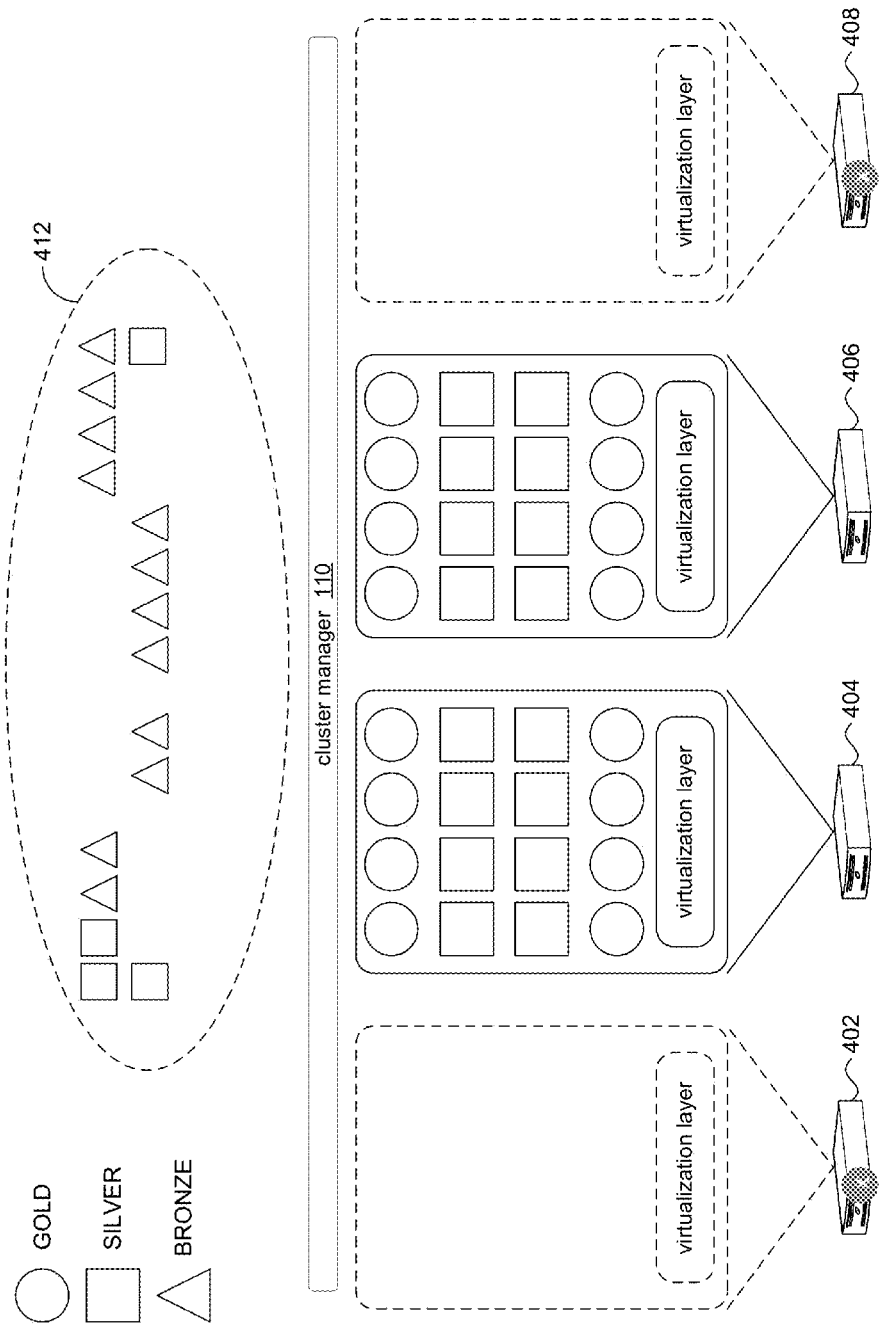
FIGS. 4D and 4E illustrate sharing of downtime in the example of a failure and recovery scenario.

Since only two clusters 404, 406 remain functioning, processing in the cluster manager 110 proceeds to steps 232 and 234, where candidate VMs among the remaining functioning hosts 404, 406 are identified for suspension. FIG. 4C shows 2 Bronze level VMs in host 404 and four Bronze level VMs in host 406 have been identified (based on their RTO values) for suspension from among the VMs that are running on hosts 404 and 406. FIG. 4C further illustrates that all eight of the Gold VMs and six of the Silver VMs from among the set 412 of suspended VMs have been selected (per step 234) to be restarted. FIG. 4D shows the result of suspending and restarting. The set 412 now comprises failed VMs of the failed hosts 402, 408 which have not been restarted and VMs that were suspended in favor of some of the higher service level failed VMs.

Figure 4E:
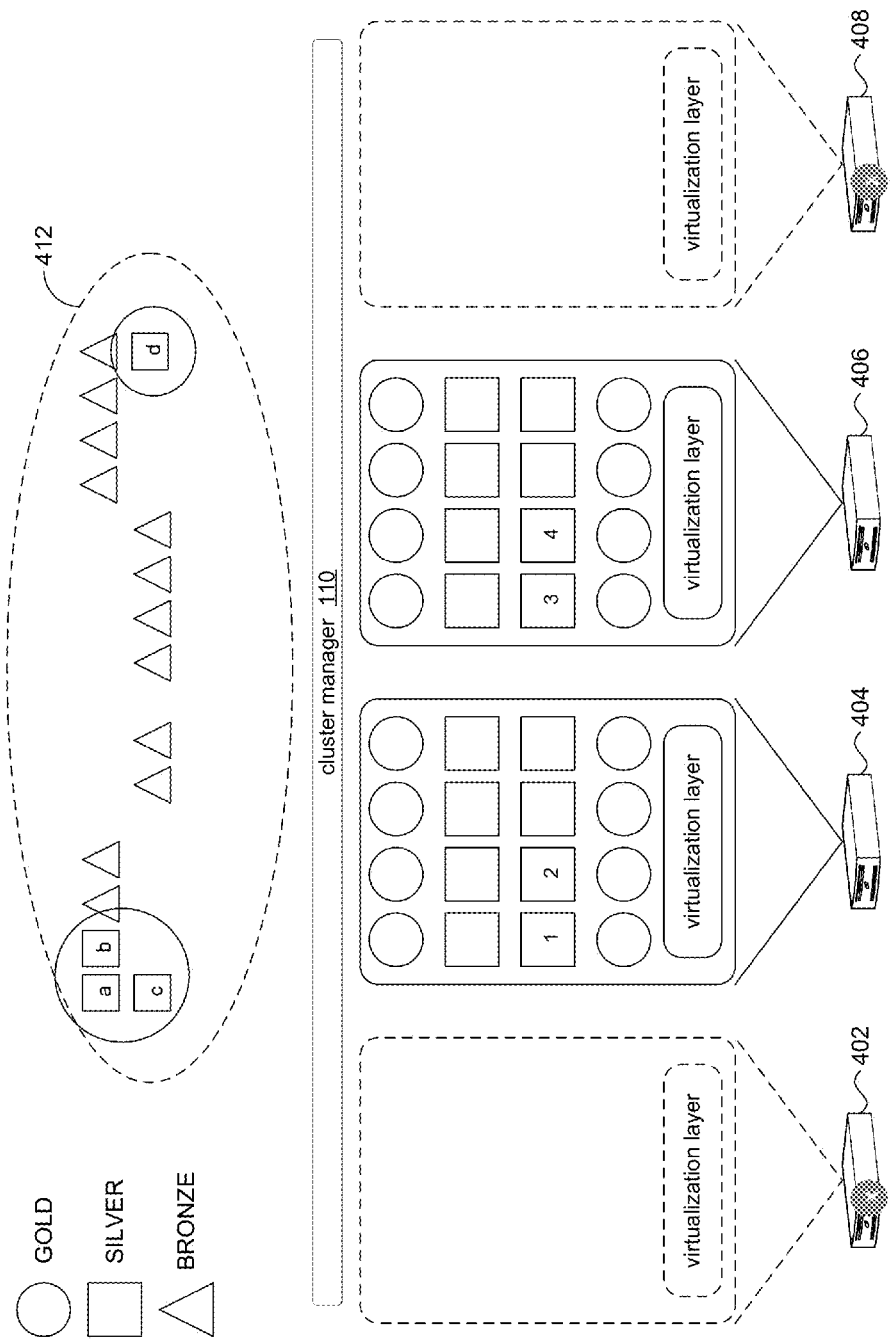
Figure 4F:
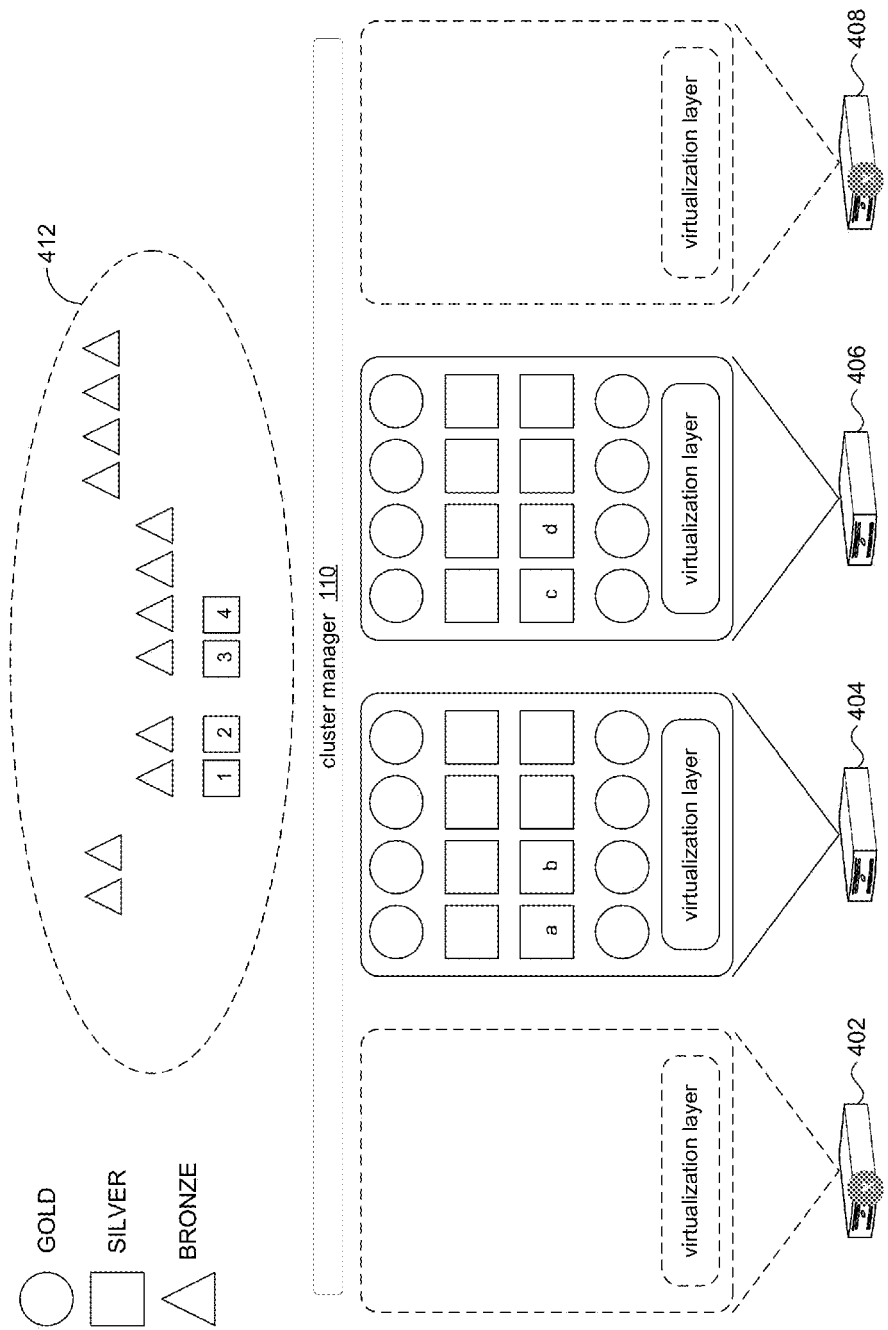
Figure 4I:
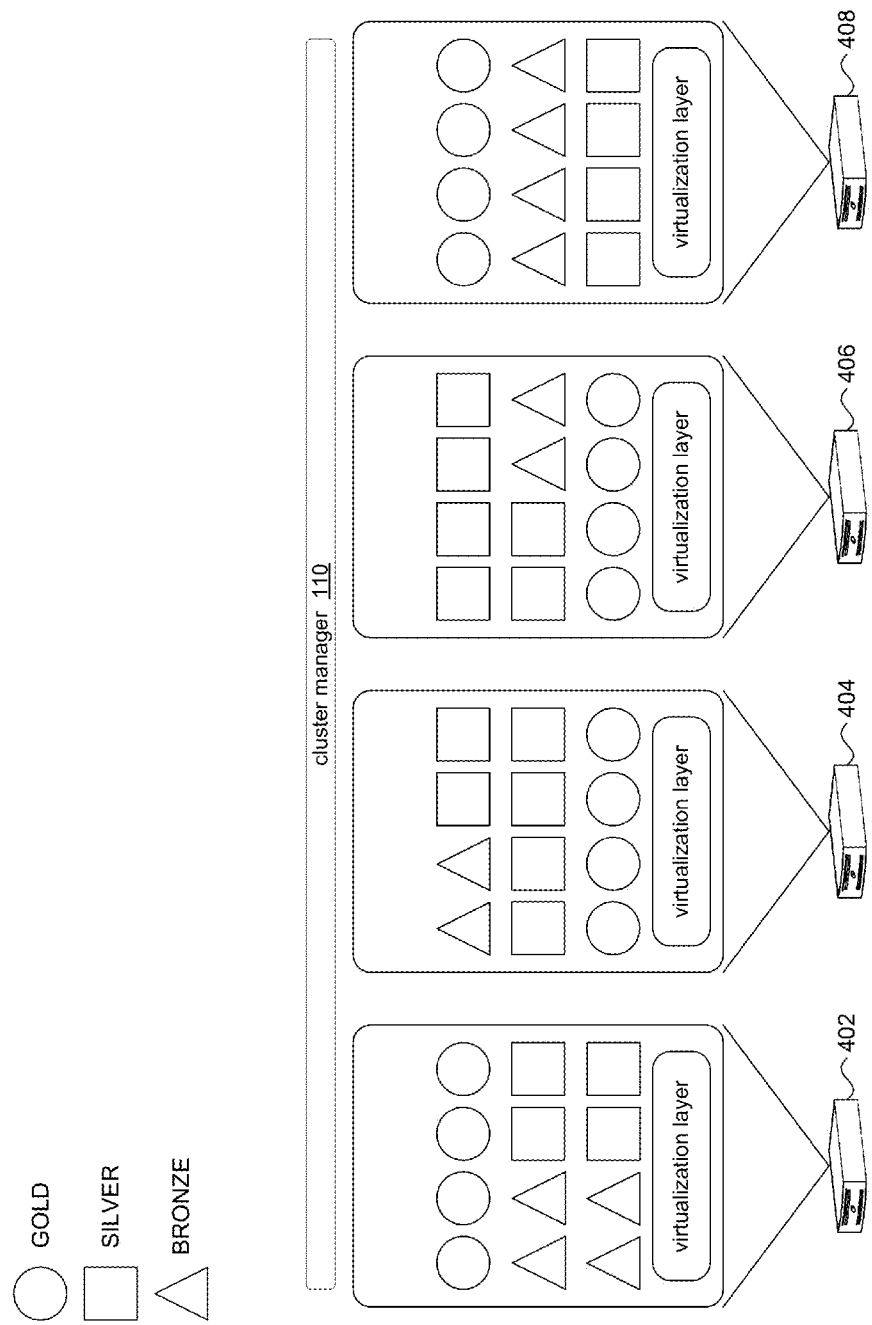
FIG. 4I illustrates redistribution in the example of a failure and recovery scenario.

Referring to FIG. 4E, during periodic monitoring (steps 226, 228), the cluster manager 110 may determine in step 228 that some VMs a-d in the set 412 may be in jeopardy of their SLAs being violated. In other words, their RTO values may be violated if they are not restarted soon. Accordingly, processing in steps 232 and 234 may identify VMs 1 and 2 in host 404 and VMs 3 and 4 in host 406 for suspension. For example, based on their RTO values or their MRV values, each VM 1-4 may have a higher RTO value than VMs a-d, or its MRV value may allow for the occurrence of an RTO violation without violating its SLA. FIG. 4F shows the result of suspending VMs 1-4 and restarting VMs a-d.

When the failed hosts 402, 408 recover, as depicted in FIG. 4G, the cluster manager 110 may deploy the VMs from the set 412 to the recovered hosts. The resulting distribution of VMs is shown in FIG. 4H. As can be seen, the loading among hosts is unbalanced. For example, hosts 404 and 406 each contains four times as many Gold level VMs as either of host 402 or 408. Moreover, there is no failover capacity in hosts 404 and 406. Accordingly, the cluster manager 110 may perform load balancing to even out the failover capacity across the hosts 402-408, resulting, for example, in the distribution shown in FIG. 4I.

An illustrative example of a placement algorithm will now be discussed. As explained above in connection with FIG. 3, the placement algorithm may be executed when a host or VM failure is detected, or periodically in the load balancing process. Generally, the placement algorithm may use as input the list of failed VMs, the list of running VMs, the list of healthy host, and the compatible hosts for each VM. The placement algorithm may also identify the tier associate with each VM and the VM's corresponding RTO, and other factors such as the counts and duration of previous failures, the cost for RTO violation, aggregated downtime for each tier, and the like. The placement algorithm will produce as output a list of the VMs to power off, a list of the VMs to power on, and the target hosts for every VM to be powered on.

Figure 5:
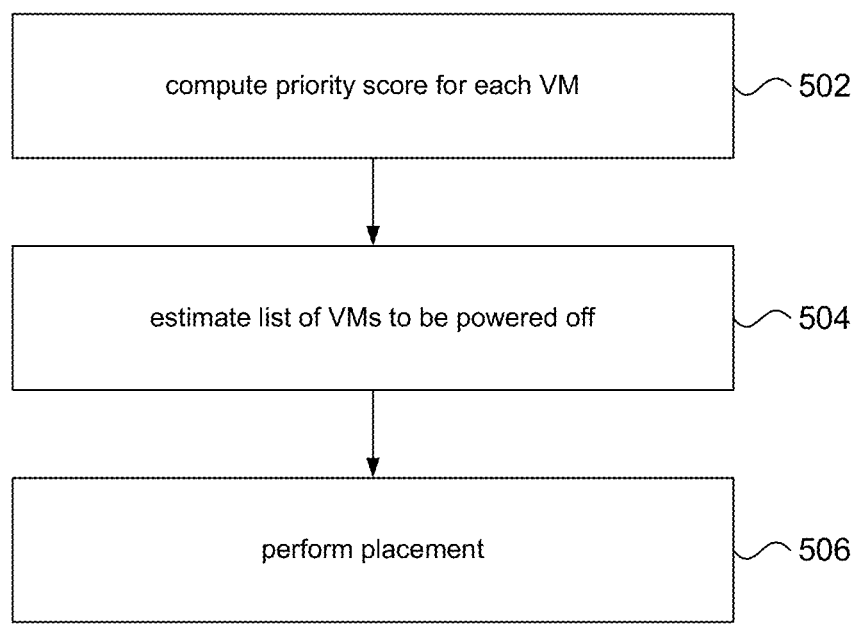
FIG. 5 illustrates an example of a placement algorithm.

Referring to FIG. 5, a step 502 includes computing a priority score for every VM. In an embodiment, for example, the priority score may be defined as the following 3-tuple:

<TierID,RTOViolationCount,DowntimeCost>, where TierID is an identifier of the tier associated with the VM,
RTOViolationCount refers to the running number of RTO violations experienced by the VM, and
DowntimeCost is a cost estimate for the VM being down (failed).

The priority scores are compared, and the VM with the highest score is selected. For example, if VM X scores higher than VM Y, then
  if both VM X and VM Y are to be restarted, the placement algorithm with restart VM X before VM Y.
  If both VM X and Y are running, the placement algorithm will consider powering off VM Y before powering off VM X.
  If VM X is to be restarted, and VM Y is running, the placement algorithm will consider powering off VM Y to free resources for VM X.

The comparison of two such priority scores is initially based on the TierID component; the higher tiered VM takes priority over a lower tiered VM. If there is a tie TierIDs, then the comparison is next based on the RTOViolationCount; the placement algorithm gives preference to the VMs that have more RTO violations thus far. In some embodiments, the RTOViolationCount also includes a metric that provides an indication of the risk for violating RTO for this failure:

RTOViolationCount=PreviousViolationCount+Min(1, (CurrentTime−FailureTime)/RTO), where currentTime is the timestamp at this moment, and FailureTime is the timestamp when the VM was down.

The DowntimeCost is designed to distinguish VMs in the same tier and with same violation history. Given the VMs downtime history, the service provider can quantify the impact of keeping the VM down at this moment. In some embodiments, for instance, using MRV the DowntimeCost can be defined as number of previous violations if it is less than MRV, or infinity otherwise. In other embodiments, the DowntimeCost can be computed simply as a aggregated downtime for this VM.

At step 504, a list of running VMs that may need to be considered for powering off is created. If the free capacity at this moment is sufficient to restart all failed VMs, then no running VMs need to be considered. In the other extreme case, the placement algorithm may consider all running VMs, at the cost of higher computation cost. Practically, with the VMs sorted in increasing order of priority score, the placement algorithm may utilize some heuristic to pick a subset (e.g., starting from the VM with lowest score) whose total resource reservation exceeds the total resource needed by the failed VM plus a margin.

At step 506, the placement is executed, for example, by invoking a placement application programming interface (API). Both the failed VMs and the VMs identify in the above steps may be marked as being "powered off." If a VM that had previously failed is placed, then that VM will be restarted. Conversely, if a running VM is not placed, then that VM will be powered off.

At step 506, the VMware DRS VM placement API (Application Program Interface) will be invoked, with both the failed VMs and all VMs in the above list marked as powered off rather than running. Finally when the API call finishes, if a failed VM is placed then it will be restarted; if a running VM is not placed, then it means it should be power off.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The term non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

The invention claimed is:

1. A method comprising:
instantiating a plurality of virtual machines on a plurality of virtual machine hosts ("hosts"), each virtual machine being associated with a recovery time objective (RTO) value and a maximum number of RTO violations (MRV) value, wherein identifying the M virtual machines is further based on an MRV value associated with each powered-on virtual machine; and
responding to a failed host by restarting failed virtual machines from the failed host on remaining functioning hosts, including:
identifying M virtual machines from among a plurality of powered-on virtual machines running on the remaining functioning hosts based on an RTO value associated with each of the powered-on virtual machines;
identifying N virtual machines from among the failed virtual machines based on an RTO value associated with each of the failed virtual machines;
suspending the M virtual machines; and
restarting the N virtual machines on one or more of the remaining functioning hosts.

2. The method of claim 1 further comprising:
identifying P virtual machines from among the virtual machines miming on the remaining functioning hosts;
identifying Q virtual machines from among the failed virtual machines;
suspending the P virtual machines; and
restarting the Q virtual machines.

3. The method of claim 2 wherein the steps recited therein are periodically performed.

4. The method of claim 2 wherein each virtual machine is further associated with a maximum number of RTO violations (MRV) value, wherein identifying the P virtual machines is based on an MRV value associated each of the virtual machines, wherein identifying the Q virtual machines is based on an MRV value associated each of the M suspended virtual machines.

5. The method of claim 4 wherein identifying the P virtual machines and identifying the Q virtual machines are further based on RTO values of the virtual machines.

6. The method of claim 1 further comprising responding to recovery of the failed host ("recovered host") including restarting the suspended M virtual machines on the recovered host.

7. The method of claim 6 further comprising, subsequent to restarting the suspended M virtual machines on the recovered host, redistributing the virtual machines running among the hosts in order that virtual machines can be restarted within the time period of their respective RTO values.

8. The method of claim 1 wherein each virtual machine is associated with a service level, wherein virtual machines that have the same service level have the same RTO value, wherein the M virtual machines have higher service levels than the N virtual machines.

9. The non-transitory computer readable storage medium of claim 1 wherein execution of the computer executable program code further causes the computer system to perform steps of:
identifying P virtual machines from among the virtual machines running on the remaining functioning hosts;
identifying Q virtual machines from among the failed virtual machines;
suspending the P virtual machines; and
restarting the Q virtual machines.

10. The non-transitory computer readable storage medium of claim 9 wherein each virtual machine is further associated with a maximum number of RTO violations (MRV) value, wherein identifying the P virtual machines is based on an MRV value associated each of the virtual machines, wherein identifying the Q virtual machines is based on an MRV value associated each of the M suspended virtual machines.

11. A computer system comprising:
one or more computer processors; and
a computer-readable storage medium comprising program instructions for controlling the one or more computer processors to be operable to:
instantiate a plurality of virtual machines on a plurality of virtual machine hosts ("hosts"), each virtual machine being associated with a recovery time objective (RTO) value and with a maximum number of RTO violations (MRV) value, wherein identifying the M virtual machines is further based on an MRV value associated with each powered-on virtual machine; and respond to a failed host by restarting failed virtual machines from the failed host on remaining functioning hosts, including:
    identify M virtual machines from among a plurality of powered-on virtual machines running on the remaining functioning hosts based on an RTO value associated with each of the powered-on virtual machines;
    identify N virtual machines from among the failed virtual machines based on an RTO value associated with each of the failed virtual machines;
    suspend the M virtual machines; and
    restart the N virtual machines on one or more of the remaining functioning hosts.

12. The computer system of claim 11
    identify P virtual machines from among the virtual machines running on the remaining functioning hosts;
    identify Q virtual machines from among the failed virtual machines;
    suspend the P virtual machines; and
    restart the Q virtual machines.

13. The computer system of claim 12 wherein each virtual machine is further associated with a maximum number of RTO violations (MRV) value, wherein identifying the P virtual machines is based on an MRV value associated each of the virtual machines, wherein identifying the Q virtual machines is based on an MRV value associated each of the M suspended virtual machines.

14. The computer system of claim 11 wherein the program instructions further control the one or more computer processors to respond to recovery of the failed host ("recovered host") including restarting the suspended M virtual machines on the recovered host.

15. The computer system of claim 14 wherein, subsequent to restarting the suspended M virtual machines on the recovered host, the program instructions further control the one or more computer processors to redistribute the virtual machines running among the hosts.

16. A non-transitory computer readable storage medium having stored thereon computer executable program code, which when executed in computer system, causes the computer system to perform steps of:
    instantiating a plurality of virtual machines on a plurality of virtual machine hosts ("hosts"), each virtual machine being associated with a recovery time objective (RTO) value and a maximum number of RTO violations (MRV) value, wherein identifying the M virtual machines is further based on an MRV value associated with each powered-on virtual machine; and
    responding to a failed host by restarting failed virtual machines from the failed host on remaining functioning hosts, including:
        identifying M virtual machines from among a plurality of powered-on virtual machines running on the remaining functioning hosts based on an RTO value associated with each of the powered-on virtual machines;
        identifying N virtual machines from among the failed virtual machines based on an RTO value associated with each of the failed virtual machines;
        suspending the M virtual machines; and
        restarting the N virtual machines on one or more of the remaining functioning hosts.

17. The non-transitory computer readable storage medium of claim 16 wherein execution of the computer executable program code further causes the computer system to perform steps of:
    responding to recovery of the failed host ("recovered host") including restarting the suspended M virtual machines on the recovered host; and
    subsequent to restarting the suspended M virtual machines on the recovered host, redistributing the virtual machines running among the hosts.

* * * * *